Dec. 21, 1937.  C. A. SAWTELLE  2,102,810
BRAKE MECHANISM
Filed May 15, 1936   3 Sheets-Sheet 1

INVENTOR
CHARLES A. SAWTELLE
BY Whittemore Hulbert & Belknap
ATTORNEYS

*INVENTOR*
CHARLES A. SAWTELLE
*ATTORNEYS*

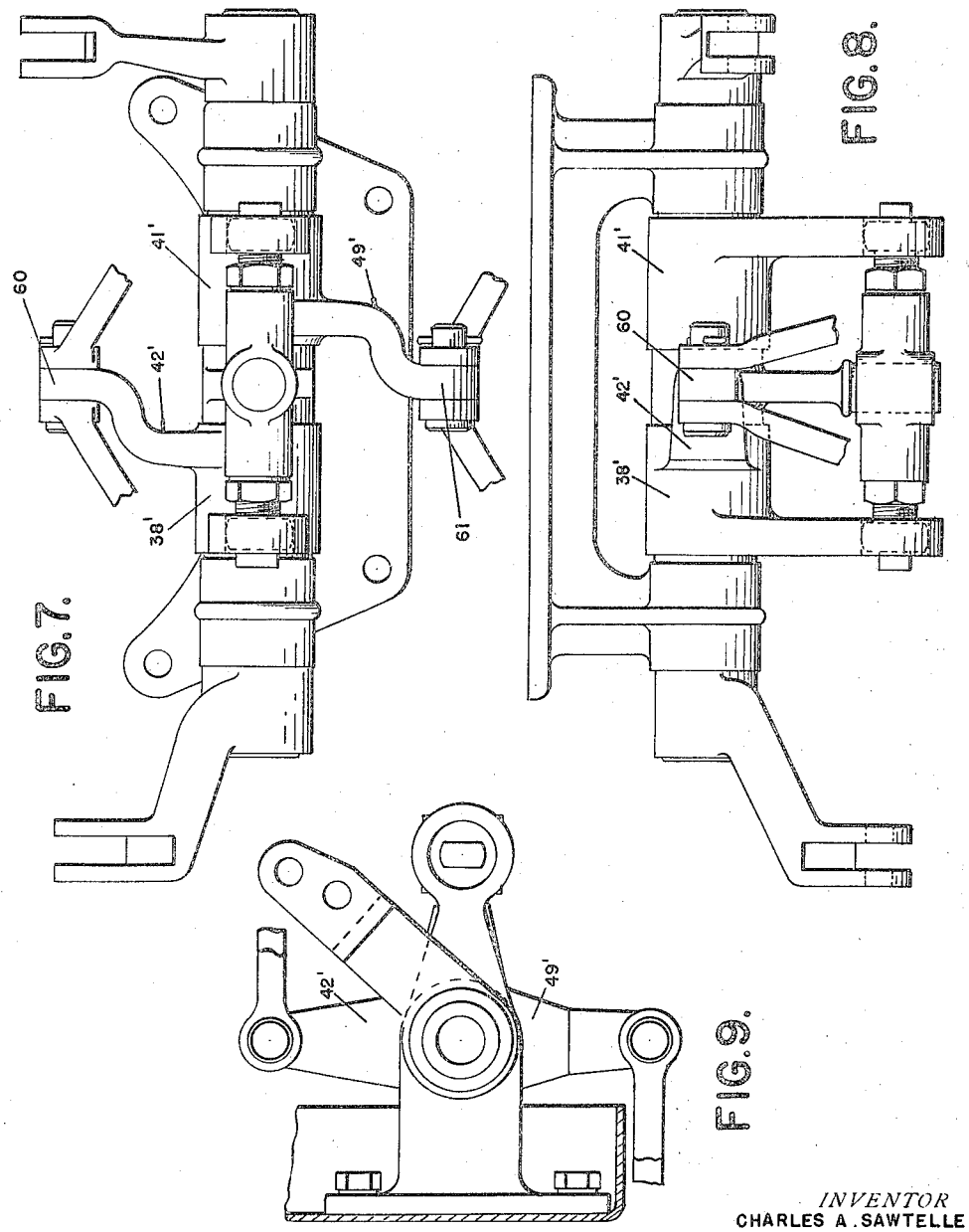

Patented Dec. 21, 1937

2,102,810

UNITED STATES PATENT OFFICE 2,102,810

BRAKE MECHANISM

Charles A. Sawtelle, Detroit, Mich., assignor to Kelsey-Hayes Wheel Company, Detroit, Mich., a corporation of Delaware Application May 15, 1936, Serial No. 79,993

13 Claims. (Cl. 188—204)

This invention relates generally to brakes and refers more particularly to improvements in brake actuating mechanism of the type employed to operate front and rear sets of brakes from a common control.

One of the principal objects of this invention is to provide brake actuating mechanism of the character set forth having relatively simple and readily accessible means for changing the proportion of the actuating force applied to the front and rear sets of brakes. This feature is of particular advantage in cases where it is desirable to employ the same brake actuating mechanism in vehicles having different body styles, since it renders it possible to expediently vary the proportion between the front and rear sets of brakes to suit the differences in weight ratios effected by different body styles.

Another advantage of this invention resides in the provision of brake actuating mechanism having means for equalizing the operation of the brakes in both sets, in addition to the means set forth in the preceding paragraph for proportioning the actuating force applied to both the aforesaid sets of brakes.

The foregoing, as well as other objects, will be made more apparent as this description proceeds, especially when considered in connection with the accompanying drawings, wherein:

Figure 7 is a side elevational view of a slightly modified form of construction;

Figure 8 is a plan view of the construction shown in Figure 7; and

Figure 9 is an end elevational view of the construction shown in Figure 7.

Figure 1:
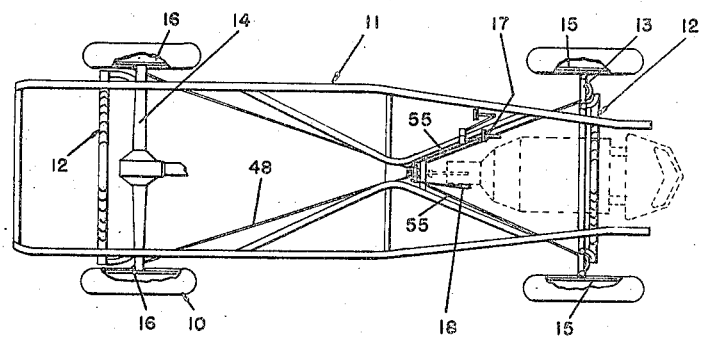
Figure 1 is a diagrammatic plan view of a portion of a vehicle equipped with brake operating mechanism constructed in accordance with this invention.

Referring now to the drawings, it will be noted that there is illustrated in Figure 1, a portion of a motor vehicle comprising an unsprung assembly 10 and a sprung assembly 11 suspended from the unsprung assembly 10 by means of the transverse springs 12. In the illustrative embodiment of the invention, the unsprung assembly 10 comprises the front and rear axles 13 and 14, respectively, having brakes associated with opposite ends thereof. The front set of brakes is designated in Figure 1 by the reference character 15 while the rear set of brakes is indicated by the reference character 16. The brakes may be of any one of the numerous accepted types of construction and are carried by the road engaging wheels in accordance with conventional practice.

Figure 2:
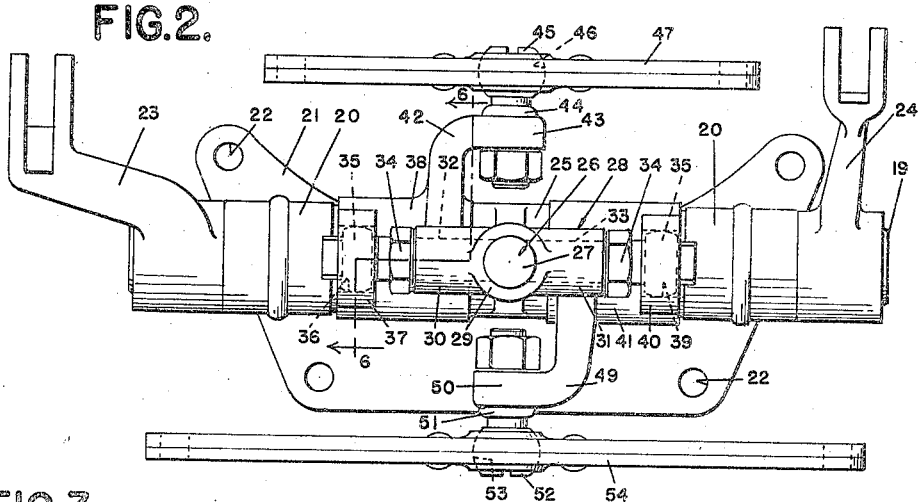
Figure 2 is a side elevational view of a part of the brake operating mechanism.
Figure 3:
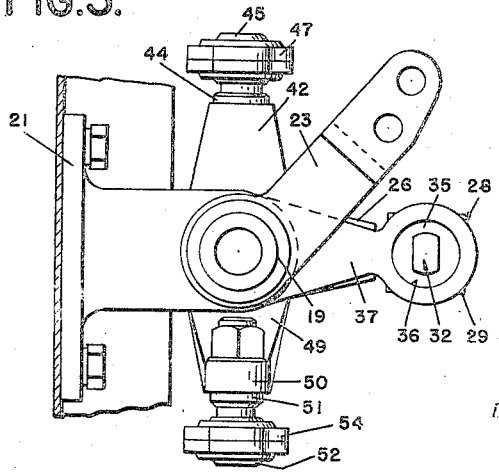
Figure 3 is an end elevational view of the construction shown in Figure 2.
Figure 6:
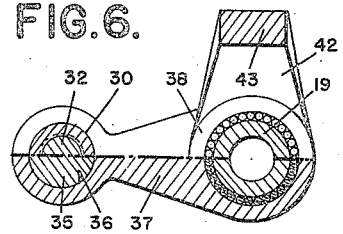
Figure 6 is a sectional view taken substantially on the plane indicated by the line 6—6 of Figure 2.

The two sets of brakes are independently operated by means of a service brake pedal 17 and an emergency brake lever 18, through the medium of a rockshaft 19 supported upon the sprung weight 11 intermediate the two sets of brakes. The rockshaft 19 extends transversely of the vehicle and is journalled in a pair of bearings 20 spaced from each other in the direction of the axis of the shaft. Upon reference to Figure 5, it will be noted that the bearings 20 are formed integral with the bracket 21 apertured as at 22 for attachment to the sprung weight of the vehicle through the medium of bolts or other fastening means, not shown. In the present instance, the opposite ends of the rockshaft 19 project beyond the bearings 20 and are respectively operatively connected to the service brake pedal 17 and emergency brake lever 18. The service brake 17 is rockably supported on the sprung weight 11 of the vehicle in the usual manner and is connected to the free end of an arm 23 having the opposite end secured to one end of the rockshaft 19. As shown in Figure 2, an arm 24 is secured to the opposite end of the rockshaft 19 and the free end of this arm is connected to the emergency brake lever 18 through the medium of the usual lost motion connection, not shown herein. The arrangement is such that rocking movement of the shaft 19 may be effected by operating either the service brake pedal 17 or the emergency brake lever 18.

Figure 4:
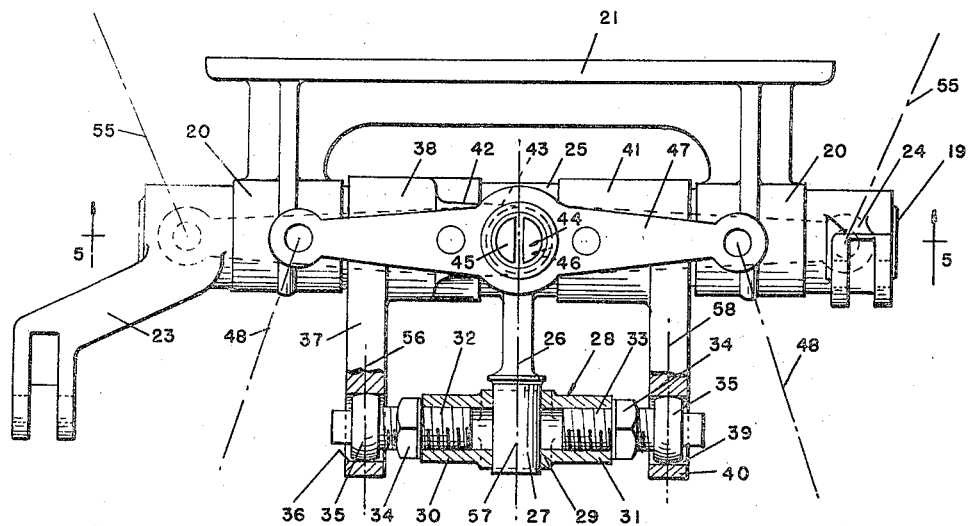
Figure 4 is a plan view of the construction shown in Figure 2.

In order to transmit rocking movement of the shaft 19 to both the front and rear sets of brakes, the following construction is provided. Secured to the rockshaft intermediate the ends thereof is a hub 25 having a radially outwardly extending arm 26 terminating at the outer end thereof in an enlarged cylindrical portion 27 forming a journal for a balancing beam 28. The axis of the journal 27 extends at right angles to the axis of the shaft 19 and the balancing beam 28 is provided with a central hub portion 29 rockably mounted on the journal 27. As shown in Figure 4, the balancing beam 28 is provided with tubular threaded ends 30 and 31 for adjustably receiving the studs 32 and 33 respectively. The studs are held in their respective adjusted positions by means of the lock nuts 34 and are provided with heads 35 adjacent the outer ends thereof. Both of the heads 35 are fashioned with spherical peripheries and the head on the stud 32 slidably engages within an opening 36 formed in the outer end of an arm 37 having a hub portion 38 at the inner end journalled on the rockshaft 19 at one side of the hub 25. The head 35 on the stud 33 likewise slidably engages within an opening 39 formed in the outer end of an arm 40 having a hub 41 at the inner end journalled on the rockshaft 19 at the opposite side of the hub 25.

Figure 5:
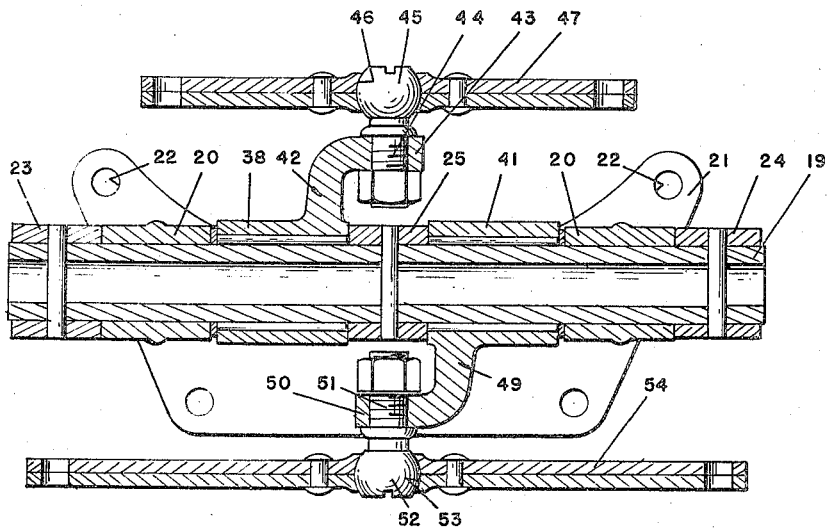
Figure 5 is a sectional view taken substantially on the plane indicated by the line 5—5 of Figure 4.

In the present instance, the hub 38 is provided with a second arm 42 terminating in an axially extending portion 43 apertured to provide for securing the stud 44 thereto. By reason of the above construction, the axis of the stud extends at right angles to the axis of the rockshaft 19 and is provided with a spherical head 45 at the outer end thereof adapted to be received in a correspondingly shaped socket 46 located in an equalizing arm 47 intermediate the ends of the latter. The construction is such as to permit universal movement of the arm 47 relative to the stud 44 and the opposite ends of the arm are respectively connected to each of the brakes in the rear set 16 through the medium of cables 48. As shown in Figure 5, the equalizing arm 47 comprises two stampings permanently secured together back to back and having aligned openings therethrough fashioned to form the spherical socket 46 for receiving the spherical head 45.

The hub 41 is also provided with a second arm 49 similar to the arm 42 in that it terminates at the outer end thereof in an axially extending portion 50 apertured to provide for securing the stud 51 to the arm in such a manner that the axis of the stud extends at right angles to the axis of the rockshaft 19. Upon reference to Figure 5, it will be noted that the construction is such that the axis of the stud 51 is also in axial alignment with the stud 44 and like the latter stud terminates at the outer end thereof in a spherical head 52 for engaging in a correspondingly shaped socket 53 formed in a second equalizing arm 54 intermediate the ends of the latter. It will be noted from Figure 5 that the arm 54 is identical in construction to the arm 47 previously described. With this arrangement, it will be understood that the arm 54 is also capable of universal movement with respect to the stud 51 and the opposite ends of this arm are operatively connected to each of the brakes in the front set by means of the cables 55. Owing to the fact that both of the equalizing arms 47 and 54 are supported for relatively free universal movement, it necessarily follows that variations in the operating characteristics of both the front and rear sets of brakes will be compensated for and that equalized braking will result.

It also follows from the foregoing that one of the aforesaid sets of brakes may be applied to a greater extent than the other set of brakes and that the proportion between the two sets may be readily varied to suit existing conditions. With the adjustment of the beam 28 shown in Figure 4, the applied force on both sets of brakes will be substantially uniform, due to the fact that the plane of contact 56 of the head 35 on the stud 32 with the arm 37 is spaced the same distance from the axis 57 of the arm 26 as the plane of contact 58 of the other head 35 with the arm 40. In order to vary the proportion between the two sets of brakes, one or the other of the studs must be adjusted to effect a differential in the distance between the axis 57 of the arm 26 and the two planes of contact of the heads 35 with the arms 37 and 40. For example, if it is desired to secure a greater braking pressure at the front set of brakes than at the rear set, the distance between the axis 57 and the plane of contact of the head 35 on the stud 32 with the arm 37 is increased by adjusting either or both the studs 32 and 33. It will, of course, be understood that if both studs are adjusted to secure the above result, the head 35 on the stud 33 will be moved toward the axis 57 and the head 35 on the stud 32 will be moved away from the axis 57. As a result of this adjustment, the leverage ratio will predominate in favor of the arm 40 for actuating the front set of brakes and, accordingly, these brakes will be applied to a greater extent than the rear set. In the event it is desired to apply the rear set of brakes to a greater extent than the front set, the reverse of the above adjustment is effected to increase the leverage ratio in favor of the arm 37 which is connected to the rear set of brakes through the equalizer 47.

The embodiment of the invention shown in Figures 7 to 9 inclusive differs from the one previously described in that the equalizing arms 47 and 54 are omitted and the rear set of brakes is operatively connected directly to a radial extension 60 on the arm 42' of the hub 38'. The front set of brakes is similarly connected to a radial extension 61 on the arm 49' of the hub 41'. With the above exceptions, the brake actuating mechanism is identical to the construction heretofore described and variations in the braking pressures secured by the two sets of brakes is obtained in the same manner as pointed out in connection with the first described form of this invention.

Thus, from the foregoing, it will be observed that I have provided a relatively simple and inexpensive brake operating mechanism capable of being readily assembled upon a vehicle. In addition, it will be noted that the means provided herein for changing the proportion of the applied force to the front and rear sets of brakes is readily accessible and is extremely simple in operation.

What I claim as my invention is:

1. Brake mechanism comprising, a rock-shaft, an arm having one end fixed to the rockshaft and provided with a journal adjacent the opposite end having its axis extending at right angles to the axis of the rockshaft, a member supported intermediate the ends thereof on said journal for rocking movement about the axis of the latter and having elements adjacent opposite ends independently adjustable toward and away from the axis of the journal, and a pair of arms having their inner ends journalled on the rockshaft and having openings in the outer ends slidably receiving said elements.

2. Brake mechanism comprising, a rockshaft, an arm having one end fixed to the rockshaft and provided with a journal adjacent the opposite end having its axis extending at right angles to the axis of the rockshaft, hubs journalled on the rock-shaft at opposite sides of the arm and having outwardly extending arms provided with openings therethrough, a member supported intermediate the ends thereof on said journal for rocking movement about the axis of the latter and having elements adjacent opposite ends slidably engageable in said openings, and means for independently adjusting the elements toward and away from the axis of the journal.

3. Brake mechanism comprising, a rock-shaft, an arm having one end fixed to the rock-shaft and provided with a journal adjacent the opposite end having its axis extending at right angles to the axis of the rockshaft, hubs journalled on the rockshaft at opposite sides of the arm and having outwardly extending arms provided with openings therethrough, a member supported intermediate the ends thereof on said journal for rocking movement about the axis of the latter and having tubular ends, and studs adjustably secured in said ends and having enlarged heads provided with spherical peripheral surfaces slidably engaging in the openings in the arms on said hubs.

4. Brake mechanism comprising, a rock-shaft, a member having one end secured to the rockshaft and having a portion extending outwardly from the rockshaft, arms journalled on the rockshaft, and variable leverage means connecting the arms to the portion aforesaid of the member.

5. Brake mechanism comprising, a rockshaft, a member having one end secured to the rockshaft and provided with a journal having its axis extending at right angles to the axis of the shaft, an arm journalled on the rockshaft on each side of the member, a beam journalled on said journal, and adjustable means connecting the ends of the beam to the free ends of the arms.

6. In a vehicle having a front set of brakes and a rear set of brakes, a rockshaft, a member having one end secured to the rockshaft and having a portion extending at right angles to the axis of the rockshaft, an arm journalled on the rockshaft at each side of the member, variable leverage means connecting the free ends of the arms to the portion aforesaid of the member, means connecting one of the arms to the front set of brakes, and means connecting the other arm to the rear set of brakes.

7. In a vehicle having a front set of brakes and a rear set of brakes, a rockshaft, a member having one end secured to the rockshaft and having a portion extending at right angles to the axis of the rockshaft, an arm journalled on the rockshaft at each side of the member, variable leverage means connecting the free ends of the arms to the portion aforesaid of the member, an equalizer bar universally mounted intermediate the ends thereof on each of the arms, means respectively connecting opposite end portions of the bar on one arm to the brakes of the front set, and means respectively connecting opposite end portions of the bar on the other arm to the brakes of the rear set.

8. In a vehicle having a front set of brakes and a rear set of brakes, a rockshaft, a member having one end secured to the rockshaft and provided with a journal having its axis extending at right angles to the axis of the shaft, an arm journalled on the rockshaft on each side of the member, a beam journalled on said journal, adjustable means connecting the ends of the beam to the free ends of the arms, means connecting one of the arms to the front set of brakes, and means connecting the other arm to the rear set of brakes.

9. In a vehicle having a front set of brakes and a rear set of brakes, a rockshaft, a member having one end secured to the rockshaft and provided with a journal having its axis extending at right angles to the axis of the shaft, an arm journalled on the rockshaft on each side of the member, a beam journalled on said journal, adjustable means connecting the ends of the beam to the free ends of the arms, means connecting one of the arms to the front set of brakes, means connecting the other arm to the rear set of brakes, an equalizer bar universally mounted intermediate the ends thereof on each of the arms, means respectively connecting opposite end portions of the bar on one arm to the brakes of the front set, and means respectively connecting opposite end portions of the bar on the other arm to the brakes of the rear set.

10. In a vehicle having a front set of brakes and a rear set of brakes, an arm having one end fixed to the rockshaft and provided with a journal at the opposite end having its axis extending radially from the rockshaft, hubs journalled on the rockshaft at opposite sides of the arm and having outwardly extending arms provided with openings therethrough, a member supported intermediate the ends thereof on said journal for rocking movement about the axis of the latter and having elements adjacent opposite ends slidably engageable in said openings, means for independently adjusting the elements toward and away from the axis of the journal, means connecting the free end of one of the hub arms to the front set of brakes, and means connecting the free end of the other hub arm to the rear set of brakes.

11. In a vehicle having front and rear sets of brakes, a rockshaft, an arm having one end fixed to the rockshaft and provided with a journal adjacent the opposite end having its axis extending at right angles to the axis of the rockshaft, hubs journalled on the rockshaft at opposite sides of the arm and having outwardly extending arms provided with openings therethrough, a member supported intermediate the ends thereof on said journal for rocking movement about the axis of the latter and having tubular ends, studs adjustably secured in said ends and having enlarged heads provided with spherical peripheral surfaces slidably engaging in the openings in the arms on said hubs, an equalizer bar universally mounted intermediate the ends thereof on each of the hub arms, means respectively connecting the free end portions of one of the equalizer bars to the brakes of the front set, and means respectively connecting the free ends of the other equalizer bar to the brakes of the rear set.

12. Brake mechanism comprising, a rockshaft, an arm having one end fixed to the rockshaft and provided with a journal adjacent the opposite end having its axis extending at right angles to the axis of the rockshaft, hubs journalled on the rockshaft at opposite sides of the arm and having outwardly extending arms provided with openings therethrough, a member supported intermediate the ends thereof on said journal for rocking movement about the axis of the latter and having elements adjacent opposite ends thereof provided with spherical peripheral surfaces slidably engaging in the openings in the hub arms, and means for independently adjusting the elements toward and away from the axis of the journal.

13. Brake mechanism comprising, a rockshaft, an arm extending from the rockshaft and having a spherical portion, an arm comprising stampings permanently secured together and having aligned openings intermediate the ends thereof fashioned to cooperate in forming a socket for receiving the spherical portion aforesaid.

CHARLES A. SAWTELLE.